Feb. 21, 1933.  K. BOSSHARDT  1,898,811
APPARATUS FOR SUPPLYING FUEL TO FLOATLESS CARBURETORS
Filed Oct. 29, 1930

Inventor:
Karl Bosshardt
by *Karl Niebaum*
Atty.

Patented Feb. 21, 1933

1,898,811

UNITED STATES PATENT OFFICE

KARL BOSSHARDT, OF BERLIN, GERMANY, ASSIGNOR TO HERMANN UTEG, METALL-WAREN G. M. B. H., OF BERLIN, GERMANY

APPARATUS FOR SUPPLYING FUEL TO FLOATLESS CARBURETORS

Application filed October 29, 1930, Serial No. 491,909, and in Germany November 2, 1929.

My invention relates to an apparatus for supplying fuel to floatless carburetors. It is an object of my invention to so design an apparatus of the kind described that the fuel supply is effected under uniform pressure.

To this end I provide a pipe line extending from a fuel tank to the suction pipe of a floatless carburetor, and means for controlling the flow of the fuel in the pipe line in conformity with the head of the fuel in the tank and the suction in the suction pipe.

In apparatus of the kind described as designed heretofore only the free area which is laid open for the flow of fuel was considered, but not the velocity of the flow in the area. Obviously, however, for regulating the quantity of fuel flowing through a given area per unit of time, the size of the area is not the only factor but the velocity of the flow in the area is equally important. The velocity is a function of the head of liquid in the fuel pipe and of the suction in the carburetor.

According to my invention not only the area laid open for the flow of the fuel but also the pressure at the fuel supply valve, is regulated, that is, the pressure is maintained practically constant.

I provide a separate valve by which the pressure of the fuel supplied to the carburetor, or to its fuel supply valve, is regulated in such manner that the absolute value of the head and of the suction, added, result in a constant pressure under all operating conditions.

In the drawing affixed to this specification and forming part thereof an apparatus embodying my invention is illustrated diagrammatically by way of example.

In the drawing

Figure 1:
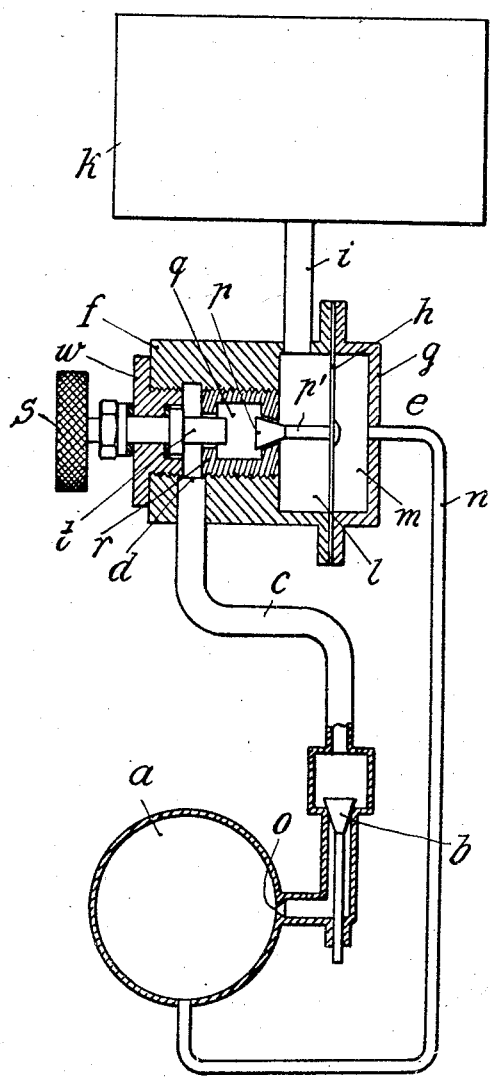
Fig. 1 is a partly sectional elevation of the apparatus.

Referring now to the drawing, and first to Fig. 1, $k$ is a fuel tank, $e$ is the casing of the apparatus, $i$ is a pipe extending from the tank to the casing, $c$ is a pipe extending from one end of the casing to the suction pipe $a$ of the carburetor, $b$ is a valve in the pipe, by which the admission of the metered fuel from pipe $c$ to its opening $o$ in the suction pipe is controlled by mechanism (not shown) connected to the throttle valve (not shown) in the suction pipe $a$. $n$ is a pipe extending to the suction pipe $a$ from the opposite side of the casing $e$. The casing $e$ comprises a body $f$, a cover $g$ and a diaphragm $h$ inserted between the cover $g$ and the body $f$. The diaphragm subdivides the casing into two chambers $l$ and $m$, the pipe $i$ being connected to the chamber $l$, and the pipe $n$ being connected to the chamber $m$. The other end of the pipe $n$ is connected to the suction pipe $a$ in the region of the inlet opening $o$.

$r$ is a hollow valve chamber, with the cavity $q$ which is threaded on the outside and inserted in corresponding threads in the body $f$. $p$ is a fuel regulating valve which is seated in the wall of the chamber $r$ which adjoins the chamber $l$, and $p'$ is the stem of the regulating valve which is secured to the diaphragm $h$, for instance, by riveting. Means are provided for rotating the valve chamber $r$ so as to vary the relative position of the valve $p$ and its seat in the chamber in conformity with the character of the fuel, its viscosity, specific gravity, and other characteristics. The means for rotating the valve chamber $r$ include a square $t$ on the inner end of a spindle which is mounted to rotate in a cover $w$ at the end of the casing $e$ which is opposite the cover $g$ of the chamber $m$, and a knurled handle $s$ on the outer end of the spindle. The square is inserted in the outer wall of the valve chamber $r$ with some clearance so that the flow of the fuel from the seat of the valve $p$ to the pipe $c$ is not interfered with.

When the pressure of the fuel increases the area laid open by the regulating valve $p$ must be reduced, and when the pressure decreases the area must be increased. The pressure of the fuel in the tank $k$ is admitted to the chamber $l$. When the pressure in this chamber increases the diaphragm $h$ is bulged in the direction of the chamber $m$ and the regulating valve $p$ reduces the free area laid open for the flow of the fuel to the carburetor. Conversely, when the pressure in the chamber $l$ decreases, the resiliency of the diaphragm moves inwardly the valve $p$ so that it exposes a larger area.

In the apparatus described, a decrease of the suction in the pipe $a$ must cause increase of the free area for the flow of fuel, and conversely, increased suction must effect reduction of the free area. This control is effected through the medium of the chamber $m$ on the opposite side of the diaphragm $h$ which is connected to the pipe $a$ by the pipe $n$. The side of the diaphragm $h$ which adjoins the chamber $m$ is under the influence of the suction in the pipe $a$, which, through the medium of the regulating valve $p$, also influences the area which the valve lays open. When the suction in the pipe $a$ becomes less intense the bulging of the diaphragm $h$ toward the chamber $m$ will be reduced, the regulating valve $p$ will move inwardly from its seat and expose a larger area for the flow of fuel. Conversely, with more intense suction in the pipe $a$, the diaphragm $h$ will reduce the area.

As the pressures in the fuel supply pipe $i$ on the one hand, and the suctions in the suction pipe $a$, on the other hand, act on the same member, to wit, the diaphragm $h$, and on the regulating valve $p$, a pressure will always be present in the chamber $l$, which pressure, added to the suction at the rear of the valve $b$, and with the absolute values of the pressure and the suction, will result in a permanently constant head.

The means for varying the relative distance of the regulating valve $p$ and its seat permit adaptation of the apparatus to various values of the forces resulting from the pressures by varying the mean area for the flow of the fuel past the regulating valve.

Figure 2:
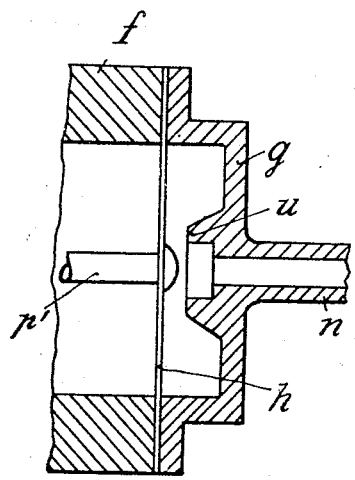
Fig. 2 is a section, drawn to a larger scale and showing means for preventing complete closing of the regulating valve.

Means for preventing closing of the regulating valve $p$ are illustrated in Fig. 2. $u$ is a check at the cover $g$ of casing $e$. When the engine runs under no load, and the throttle valve (not shown) is closed, corresponding to excessive reduction of pressure in the pipe $a$, the diaphragm $h$ strikes the check $u$ and arrests the valve $p$ so that it is not seated and the supply of fuel is not interrupted under no-load conditions.

Figure 3:
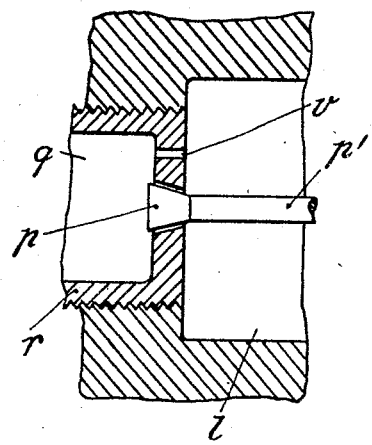
Fig. 3 is a section, also drawn to a larger scale, for by-passing the fuel past the regulating valve.

Referring now to Fig. 3, $v$ is a bore in the wall of the valve chamber $r$ the diameter of which is determined in conformity with the quantity of fuel required under no load. The bore acts as a by-pass for the valve $p$ so that the valve may be seated but still the flow of fuel is not interrupted.

The same effect will be attained by providing a notch or a groove in the valve $p$, or in its seat.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. An apparatus for supplying fuel to floatless carburetors comprising a fuel tank, a pipe line extending from said fuel tank to the suction pipe of said carburetor, a movable control member, one side of said control member being under the pressure of the fuel and its other side being under the suction in said suction pipe, means for regulating the flow of fuel in said pipe line under the control of said member, means for by-passing a portion of the fuel past said regulating means and means for maintaining a constant head at opposite sides of said fuel valve.

2. An apparatus for suplying fuel to floatless carburetors comprising a fuel tank, a casing, a movable member subdividing said casing into two chambers, one of said chambers being connected to said fuel tank, and the other chamber being connected to the suction pipe of said carburetor, a pipe line extending from said first-mentioned chamber to said suction pipe, a fuel valve operatively connected to said movable member and arranged immediate said first-mentioned chamber and said pipe line, a hollow member also arranged intermediate said first-mentioned chamber and said pipe line, a seat for said fuel valve in said hollow member, and means for displacing said hollow member.

In testimony whereof I affix my signature.

KARL BOSSHARDT.